United States Patent

Kim

[11] Patent Number: 6,075,917
[45] Date of Patent: Jun. 13, 2000

[54] JITTER COMPENSATING METHOD AND DEVICE FOR OSD

[75] Inventor: Hue-man Kim, Suwon, Rep. of Korea

[73] Assignee: Samsung Electronics Co., Ltd., Kyungki-Do, Rep. of Korea

[21] Appl. No.: 08/941,670

[22] Filed: Sep. 30, 1997

[30] Foreign Application Priority Data

Dec. 31, 1996 [KR] Rep. of Korea .................. 96-80104

[51] Int. Cl.[7] ........................................... H04N 5/94
[52] U.S. Cl. .................. 386/47; 386/68; 386/85
[58] Field of Search ................... 386/2, 6–8, 13, 386/15–16, 34, 47, 66–68, 81–82, 85–88; 348/497–498, 616–617

[56] References Cited

U.S. PATENT DOCUMENTS

| | | | |
|---|---|---|---|
| 4,287,529 | 9/1981 | Tatami et al. | 348/616 |
| 4,736,238 | 4/1988 | Moriyama et al. | 386/34 |
| 4,947,264 | 8/1990 | Narusawa | 386/66 |

Primary Examiner—Wendy Garber
Assistant Examiner—Christopher Onuaku
Attorney, Agent, or Firm—Sughrue, Mion, Zinn, Macpeak & Seas, PLLC

[57] ABSTRACT

A jitter compensating device for an on-screen display (OSD) of a picture reproducing apparatus which performs a normal-play mode and a special-play mode includes a compensating vertical synchronous signal generator for receiving a vertical synchronous signal provided from a synchronous signal separator, and for generating a compensating vertical synchronous signal during a period when a dropout occurs. A switching portion selectively outputs either the vertical synchronous signal, provided from the synchronous signal separator, or the compensating vertical synchronous signal provided from the compensating vertical synchronous signal generator based upon a signal from a controller which controls the switching portion according to the normal-play mode or the special-play mode. The OSD processor operates according to the vertical synchronous signal when in the normal-play mode, and according to the compensating vertical synchronous signal when in the special-play mode. Therefore, the jitter of the OSD screen during the special-play mode can be prevented, improving reliability of the product.

5 Claims, 3 Drawing Sheets

JITTER COMPENSATING METHOD AND DEVICE FOR OSD

BACKGROUND OF THE INVENTION

The present invention relates to a picture reproducing apparatus such as a video cassette recorder (VCR) or a camcorder, and more particularly, to a jitter compensating device for an on-screen display (OSD) in a picture reproducing apparatus. The apparatus according to the present invention is capable of preventing jitter of an OSD screen in the vertical direction, which is caused when an OSD processor mis-recognizes noise as a vertical synchronous signal, the noise component generated according to the state of a tape or a head traveling state when a special-play mode is performed while the OSD screen is displayed in a main screen of a picture reproducing apparatus.

A picture reproducing apparatus having the OSD function may display the OSD screen on a main screen during a special-play mode such as a still picture mode, a forward picture search mode or a reverse picture search mode.

When a general picture reproducing apparatus performs a special-play mode, the video head traces across the video tape differently from when in a normal-play mode. Therefore, an envelope waveform is not flat, and the uneven envelope waveform is manifested on a TV screen as noise.

Thus, when a conventional picture reproducing apparatus performs a special-play mode while displaying an OSD screen in a main screen, a vertical synchronous signal is generated containing errors due to the noise generated by the uneven envelope waveform. As a result, an OSD processor mis-recognizes the noise as a vertical synchronous signal, so that the OSD screen has vertical jitter.

Due to the above problem, the conventional picture reproducing apparatus can not display the OSD screen on the main screen during a special-play mode without jitter.

SUMMARY OF THE INVENTION

To solve the above problems, it is an object of the present invention to provide a jitter compensating device for an on-screen display (OSD), in which an inverse vertical synchronous signal and a dropout compensation pulse are AND-operated to generate a compensating vertical synchronous signal, and the pulse width of the compensating vertical synchronous signal input to an OSD processor during a special-play mode is locked to a predetermined width, thereby preventing the OSD screen from jittering.

To achieve the above object, there is provided a jitter compensating device for an on-screen display (OSD), of a picture reproducing apparatus which performs a normal-play mode and a special-play mode and includes a synchronous signal separator for separating a received picture signal into a horizontal synchronous signal and a vertical synchronous signal and an OSD processor for processing predetermined OSD data into an OSD screen, the jitter compensating device comprising: a compensating vertical synchronous signal generator for receiving a vertical synchronous signal provided from the synchronous signal separator, and for generating a compensating vertical synchronous signal during a period when a dropout occurs; a switching portion for selectively outputting either the vertical synchronous signal, provided from the synchronous signal separator, or the compensating vertical synchronous signal provided from the compensating vertical synchronous signal generator; and a controller for controlling the switching portion according to the normal-play mode or the special-play mode, wherein the OSD processor operates according to the vertical synchronous signal when in the normal-play mode, and according to the compensating vertical synchronous signal when in the special-play mode.

In the present invention, preferably, the compensating vertical synchronous signal generator comprises: a dropout compensated-interval detector for detecting an interval where a dropout occurs; an AND gate for AND-operating a pulse output from the dropout compensated-interval detector and the vertical synchronous signal; and a width limiter for limiting the pulse width of the vertical synchronous signal output from the AND gate to a predetermined width.

In addition, preferably, the width limiter is a monomultivibrator portion for locking the pulse width of the compensating vertical synchronous signal to the width corresponding to three horizontal synchronous intervals (3 H).

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
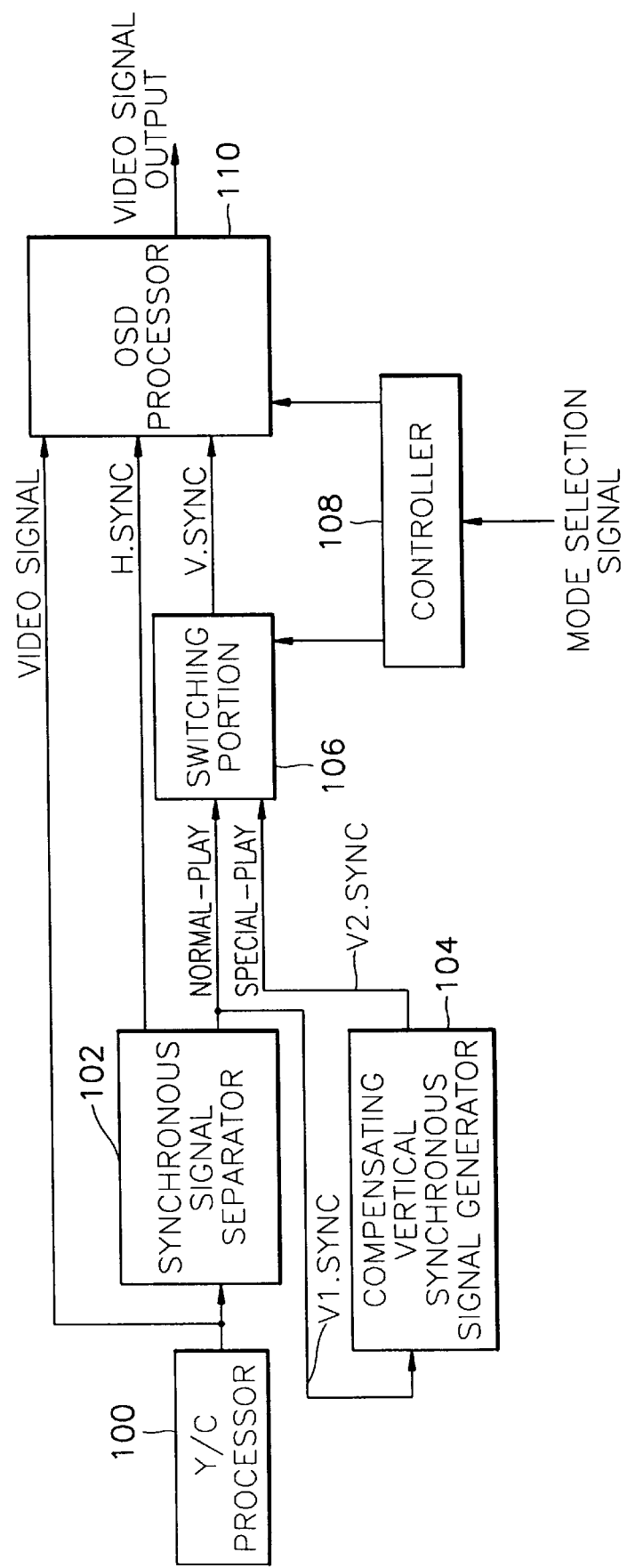
FIG. 1 is a block diagram of a picture reproducing apparatus having a jitter compensating device for an on-screen display (OSD), according to the present invention.

In FIG. 1, a picture reproducing apparatus according to the present invention includes a Y/C processor 100, a synchronous signal separator 102, a compensating vertical synchronous signal generator 104, a switching portion 106, a controller 108 and an on-screen display (OSD) processor 110.

The synchronous signal separator 102 receives a signal output from the Y/C processor 100 in order to separate a horizontal synchronous signal (H.SYNC) and a vertical synchronous signal (V1.SYNC) from the received signal.

The compensating vertical synchronous signal generator 104 inverts the vertical synchronous signal output from the synchronous signal separator 102, performs an AND-operation on the inverted vertical synchronous signal and a dropout compensation pulse, and then limits the pulse width of the inverted vertical synchronous signal to a predetermined width (e.g., 3 H width corresponding to three horizontal synchronous intervals) in the dropout compensating interval.

The switching portion 106 selectively outputs either the vertical synchronous signal (V1.SYNC) output from the synchronous signal separator 102 or the compensating vertical synchronous signal (V2.SYNC) output from the compensating vertical synchronous signal generator 104 as a selected vertical synchronous signal (V.SYNC), according to a control signal from the controller 108.

The controller 108 outputs a predetermined control signal, for controlling the operation of the switching portion 106, and OSD data including information related to the size and location of the OSD screen. That is, the controller 108 outputs a "low" signal during a normal-play mode and a "high" signal during a special-play mode, to the switching portion 106.

Thus, the switching portion 106 outputs the vertical synchronous signal output from the synchronous signal separator 102 if the control signal is low, and outputs the compensating vertical synchronous signal output from the compensating vertical synchronous signal generator 104 if the control signal is high.

The OSD processor 110 receives the horizontal synchronous signal from the synchronous signal separator 102, a vertical synchronous signal selected according to a normal-play mode or a special-play mode from the switching portion 106, and the OSD data from the controller 108, thereby displaying the OSD picture in the main screen.

Figure 2:
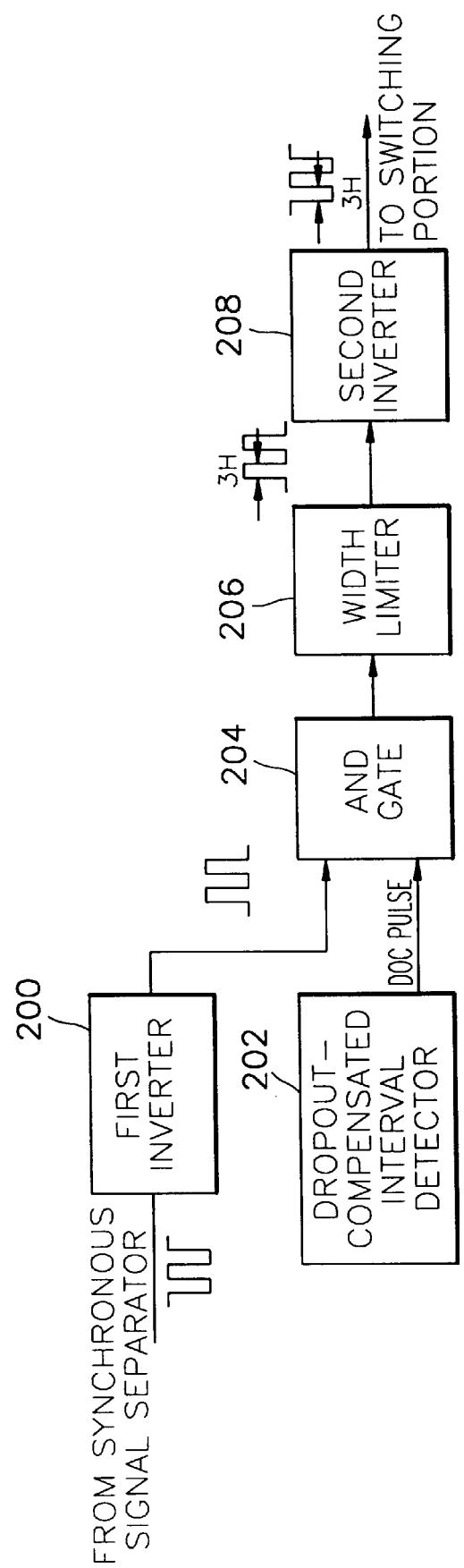
FIG. 2 is a detailed block diagram of the compensating vertical synchronous signal generator of FIG. 1.

FIG. 2 is a detailed block diagram of the compensating vertical synchronous signal generator 104 of FIG. 1.

The compensating vertical synchronous signal generator of FIG. 2 includes a first inverter 200, a dropout compensated interval detector 202, an AND gate 204, a width limiter 206 and a second inverter 208. The first inverter 200 is for inverting the vertical synchronous signal output from the synchronous signal separator 102. The dropout compensated-interval detector 202 is for detecting a dropout compensation interval generated by a blank portion of the envelope waveform, caused during the special-play mode by the video head tracing differently or by video tape damage, to generate a dropout compensation (DOC) pulse. The AND gate 204 is for AND-operating the dropout compensation pulse output from the dropout compensated-interval detector 202 and the vertical synchronous signal inverted by the first inverter 200. The width limiter 206 is for limiting the pulse width of the vertical synchronous signal output from the AND gate 104 to a predetermined width. The second inverter 208 is for inverting the signal output from the width limiter 206. Here, the width limiter 206 according to an embodiment of the present invention is a 3 H mono-multivibrator portion for locking the pulse width of the signal to 3 H.

Referring to FIGS. 1 through 4, the operation of the OSD screen jitter compensating device during a special-play mode, according to the present invention, will be described.

When a user commands a picture reproducing apparatus to perform a playback operation, the Y/C processor 100 processes a Y/C signal and outputs the processed Y/C signal to the synchronous signal separator 102 and the OSD processor 110.

The synchronous signal separator 102 receives the signal output from the Y/C processor 100 and separates the signal into a horizontal synchronous signal and a vertical synchronous signal. Here, the horizontal synchronous signal is output to the OSD processor 110, while the vertical synchronous signal is input to the switching portion 106, both directly and via the compensating vertical synchronous signal generator 104. That is, in the normal-play mode, the vertical synchronous signal separated by the synchronous signal separator 102 is selected and output by the switching portion 106, as controlled by a control signal output from the controller 108. Thus, the vertical synchronous signal is input to the OSD processor 110 together with the horizontal synchronous signal. Here, the compensating vertical synchronous signal, input to the switching portion 106 from the compensating synchronous signal generator 104 for the special-play mode, is not selected.

The process of the signal input to the compensating vertical synchronous signal generator 104 during a special-play mode will be described in detail.

As shown in FIG. 2, the vertical synchronous signal separated by the synchronous signal separator 102 is inverted by the first inverter 200 and then input to one input of the AND gate 204. The dropout compensation (DOC) pulse, output from the dropout compensated-interval detector 202, is input to the other input of the AND gate 204.

Figure 3:
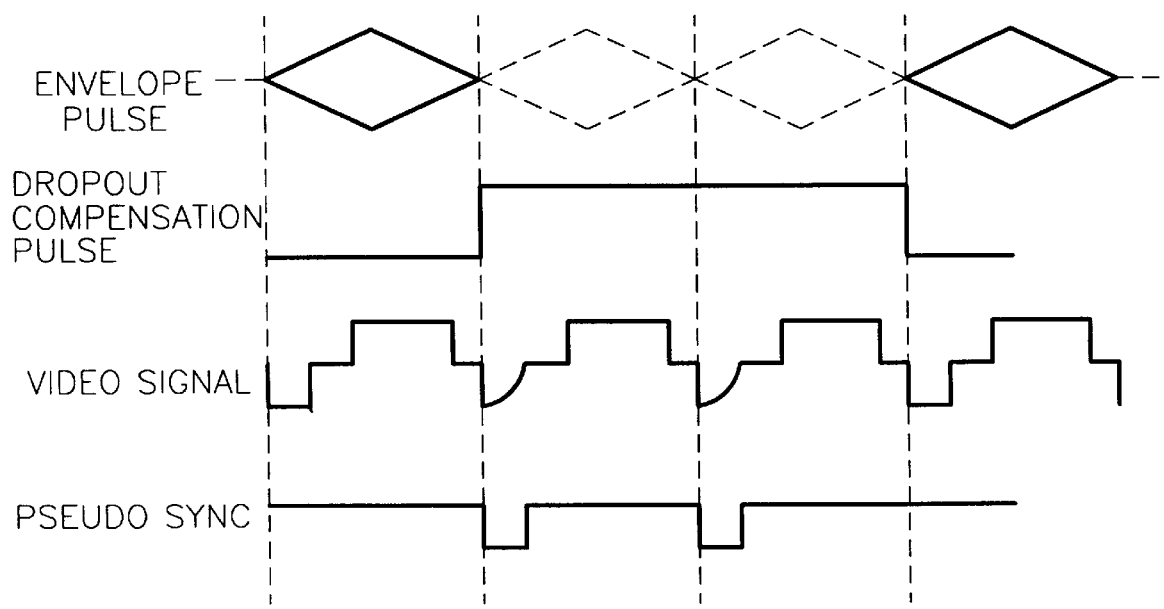
FIG. 3 shows the relationship between an envelope waveform and a pseudo vertical synchronous signal being synchronized with the envelope waveform, during a special-play mode.

Here, in the case of the special-play mode, the envelope waveform as shown in FIG. 3 is not flat, due to the fact that the tape travels differently and the video head traces across the tape differently from when in the normal-play mode. This causes a blank portion in the envelope waveform, and the blank portion appears as noise on a TV screen. The noise caused by the blank portion of the envelope waveform is compensated by a dropout compensator (not shown). The dropout compensated-interval detector 202 detects the dropout compensated-interval and outputs the DOC pulse.

When watching a still screen (as one function of the special-play mode), the main screen vertically jitters together with the OSD screen. This is because the noise component, corresponding to the blank portion of the envelope waveform as shown in FIG. 3, affects the vertical synchronous signal of the video signal. As a result, the vertical synchronous signal is erased or lost, so that the OSD processor 110 makes an error in the detection of the vertical synchronous signal.

Figure 4:
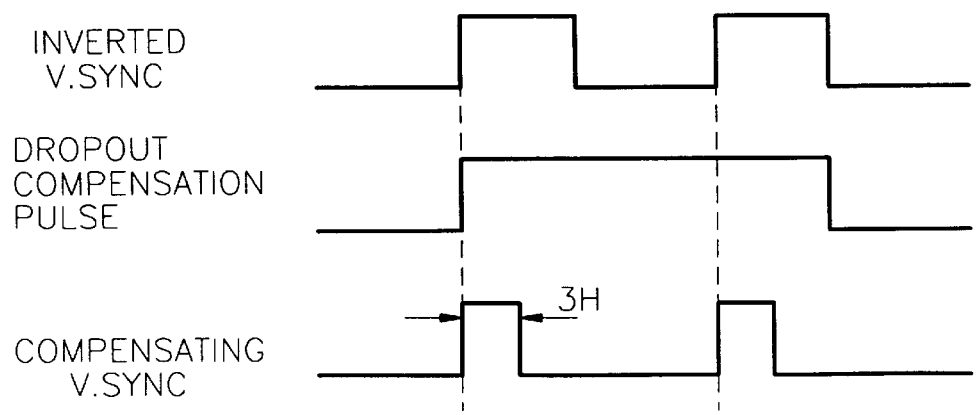
FIG. 4 shows the relationship between a dropout compensation pulse and a compensating vertical synchronous signal.

The AND gate 204 receives the inverted vertical synchronous signal output from the first inverter 200, and the DOC pulse output from the dropout compensated-interval detector 202, to perform the AND operation. Here, the AND gate 204 limits the pulse width of the output pulse to within the pulse width of the inverted vertical synchronous signal, even when the width of the DOC pulse is increased by excessive noise caused by a wide blank portion of the envelope waveform. That is, as shown in FIG. 4, the output pulse of the AND gate 204 is a compensating vertical synchronous signal being synchronous with the DOC pulse.

However, the above-obtained output pulse of the AND gate 204 cannot compensate the vertical synchronous signal perfectly. In other words, assuming the pulse width of a normal vertical synchronous signal is 3 H, the pulse width of the synchronous signal output from the AND gate 204 does not coincide exactly with 3 H, due to other factors. If the pulse width of the output signal of the AND gate 204 is below or above 3 H, the jitter of the OSD screen cannot be prevented. Thus, in order to prevent this phenomenon, the width limiter (3 H mono-multivibrator portion) 206 must make the pulse width of the compensating vertical synchronous signal exactly 3 H.

The second inverter 208 inverts the compensating vertical synchronous signal having a pulse width of 3 H, output from the width limiter 206, and outputs the result to the switching portion 106.

The switching portion 106 selectively outputs either the normal vertical synchronous signal or the compensating vertical synchronous signal, to the OSD processor 110, according to the control signal from the controller 108.

As described above, in the OSD screen jitter compensating device during a special-play mode, according to the present invention, the jitter of the OSD during the special-play mode, which has been caused by a conventional picture reproducing apparatus, can be prevented, thus improving reliability of the product.

What is claimed is:

1. A jitter compensating device for an on-screen display (OSD), of a picture reproducing apparatus which performs a normal-play mode and a special-play mode and includes a synchronous signal separator for separating a received picture signal into a horizontal synchronous signal and a vertical synchronous signal and an OSD processor for processing predetermined OSD data into an OSD screen, said jitter compensating device comprising:

a compensating vertical synchronous signal generator which receives a vertical synchronous signal provided from said synchronous signal separator, and which generates a compensating vertical synchronous signal during a period when a dropout occurs;

a switching portion for selectively outputting one of said vertical synchronous signal, provided from said synchronous signal separator, and said compensating vertical synchronous signal provided from said compensating vertical synchronous signal generator; and a controller for controlling said switching portion according to said normal-play mode or said special-play mode, wherein said OSD processor operates according to said vertical synchronous signal when in said normal-play mode, and according to said compensating vertical synchronous signal when in said special-play mode.

2. The jitter compensating device of claim 1, wherein said compensating vertical synchronous signal generator comprises:

a dropout compensated-interval detector which detects an interval where dropout occurs in said received picture signal;

an AND gate for AND-operating a pulse signal output from said dropout compensated-interval detector and said vertical synchronous signal; and a width limiter for limiting the pulse width of said compensating vertical synchronous signal output from the AND gate to a predetermined width.

3. The jitter compensating device of claim 2, wherein said width limiter is a mono-multivibrator portion for locking the pulse width of said compensating vertical synchronous signal to the width corresponding to three horizontal synchronous intervals (3 H).

4. A jitter compensating method for use in an on-screen display (OSD), of a picture reproducing apparatus which performs a normal-play mode and a special-play mode and includes a synchronous signal separator for separating a received picture signal into a horizontal synchronous signal and a vertical synchronous signal and an OSD processor for processing predetermined OSD data into an OSD screen, said jitter compensating method comprising the steps of:

receiving a vertical synchronous signal provided from said synchronous signal separator;

generating a compensating vertical synchronous signal during a period when a dropout occurs;

selectively outputting one of said vertical synchronous signal and said compensating vertical synchronous signal; and controlling said switching step according to said normal-play mode or said special-play mode, wherein said OSD processor operates according to said vertical synchronous signal when in said normal-play mode, and according to said compensating vertical synchronous signal when in said special-play mode.

5. The jitter compensating method of claim 4, wherein said step of generating said compensating vertical synchronous signal generator comprises the steps of:

detecting an interval where dropout occurs in said received picture signal;

AND-operating a pulse signal detected in said detecting step and said vertical synchronous signal; and limiting the pulse width of said compensating vertical synchronous signal generated from said AND-operating step to a predetermined width.

* * * * *